(12) United States Patent
McBride et al.

(10) Patent No.: US 9,049,158 B2
(45) Date of Patent: Jun. 2, 2015

(54) COMMUNICATION SESSION ADMISSION CONTROL SYSTEMS AND METHODS

(75) Inventors: Brian McBride, Carp (CA); Peter Rabinovitch, Kanata (CA); Adrian Grah, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1947 days.

(21) Appl. No.: 11/288,479

(22) Filed: Nov. 29, 2005

(65) Prior Publication Data

US 2007/0121500 A1    May 31, 2007

(51) Int. Cl.
| | |
|---|---|
| H04L 12/26 | (2006.01) |
| H04L 12/927 | (2013.01) |
| H04L 12/54 | (2013.01) |
| H04L 12/801 | (2013.01) |
| H04L 12/911 | (2013.01) |

(52) U.S. Cl.
CPC .............. *H04L 47/801* (2013.01); *H04L 12/26* (2013.01); *H04L 12/5695* (2013.01); *H04L 43/00* (2013.01); *H04L 47/15* (2013.01); *H04L 47/783* (2013.01); *H04L 47/822* (2013.01)

(58) Field of Classification Search
USPC ....................................................... 370/230
See application file for complete search history.

(56) References Cited

U.S. PATENT DOCUMENTS

| | | | |
|---|---|---|---|
| 5,444,706 A * | 8/1995 | Osaki ............................ | 370/230 |
| 6,678,250 B1 * | 1/2004 | Grabelsky et al. ............ | 370/241 |
| 6,744,767 B1 | 6/2004 | Chiu et al. | |
| 7,221,656 B1 * | 5/2007 | Aweya et al. .................. | 370/252 |
| 7,417,991 B1 * | 8/2008 | Crawford et al. ............. | 370/394 |
| 2003/0123393 A1 * | 7/2003 | Feuerstraeter et al. ....... | 370/235 |
| 2004/0001434 A1 * | 1/2004 | Chen et al. ..................... | 370/229 |
| 2004/0246895 A1 * | 12/2004 | Feyerabend .................. | 370/229 |

FOREIGN PATENT DOCUMENTS

| | | |
|---|---|---|
| EP | 1 217 793 A2 | 6/2002 |
| WO | WO 00/33606 | 6/2000 |
| WO | WO 02/07381 A2 | 1/2002 |

* cited by examiner

*Primary Examiner* — Alex Skripnikov
(74) *Attorney, Agent, or Firm* — Eckert Seamans Cherin & Mellott, LLC

(57) ABSTRACT

Communication session admission control systems and methods are disclosed. A state of a communication system is monitored, and admission of a communication session into the communication system is controlled based on a random admission control procedure and a current state of the communication system. Monitoring of the current state of equipment in the communication system, connections in the communication system, communication sessions in progress in the communication system, special monitoring sessions established in the communication system, and/or an overall state of the communication system can have several benefits. These benefits may include improving utilization of resources in the system, and providing a session admission control scheme that is capable of reacting to actual observed conditions and adapting to changing system topologies following a fault, for instance. Random admission control further avoids all or nothing session blocking, which can have the undesirable effect of prompting a high number of session retries.

18 Claims, 3 Drawing Sheets

COMMUNICATION SESSION ADMISSION CONTROL SYSTEMS AND METHODS

FIELD OF THE INVENTION

This invention relates generally to communications and, in particular, to admission control for communication systems.

BACKGROUND

Media gateways need to know when they should accept and reject communication sessions to maintain a specified quality level. Voice over Internet Protocol (VoIP) gateways, for example, should be able to determine when additional calls can be admitted to a network without degrading voice quality for conversations. While modern voice codecs can deal with loss and jitter, there are bounds on these quality measures that can impact a service.

Currently available Traffic Engineering (TE) solutions establish pre-computed bandwidth thresholds that are negotiated network-wide, such that if all thresholds from all gateway circuits are honored, voice quality in a communication network will be sufficient. Asynchronous Transfer Mode (ATM), Multi-Protocol Label Switching (MPLS), Time Division Multiplexing (TDM), and other circuit-based approaches create a static mesh of circuits between all the gateways and assign bandwidth and delay thresholds to those circuits. Quality of Service (QoS) thresholds can be soft bounds that are renegotiated in the event the QoS requirements of a gateway exceed the circuit parameters.

One problem with these approaches is that they add tremendous complexity without directly addressing the root problem, i.e., how to make call admission decisions based on the impact of a given call being set up. TE systems are suited to User Network Interface (UNI) service delivery points and leased line services where a negotiated limit needs to be set and enforced. The goal of TE is assignment of resources based on negotiated or anticipated needs, not optimization of network utilization and QoS differentiation in real time in ad-hoc packet switched systems, for example.

TE solutions also require a homogeneous network. Admission control elements and intermediate equipment must interoperate in these solutions, thereby binding success of a gateway-based admission control mechanism to the successful deployment of the infrastructure to support it.

In addition, currently available TE solutions do not respond dynamically to actual network conditions. Instead, they assume that all expected bandwidths between end user equipment can be pre-computed. TE solutions thus approximate bandwidth and delay measures and do not rely on real measurements of the actual network at the time a call is to be routed.

Reliable traffic profiles are required for accurate estimates and effective operation of TE systems. Certain call types such as voice with echo suppression and variable compression, however, do not have well defined profiles. Therefore, TE approaches often apply averaging over large numbers of connections, but there is always error. Defining profiles for every possible type of call can also be time consuming and thus can add cost to a system.

In the context of pre-computed versus actual bandwidth, TE approaches do not monitor actual bandwidth usage and availability, as they only track bandwidth that has been previously allocated and, through renegotiation, what could be increased. Allocated bandwidth is considered to be unavailable, regardless of whether that bandwidth is actually used. This can be undesirable since total network bandwidth can be limited by physical infrastructure or Virtual Private Network (VPN) limits, for example.

Similarly, circuit/path bandwidth availability calculations may not reflect actual available bandwidth. These calculations may indicate that pre-computed bandwidth has run out even though the network may still support bandwidth usage and thus additional sessions.

Pre-computation also relies on a specific current network topology. When failures occur, actual topology may change and these calculations are no longer valid. Failover mechanisms may attempt to find alternate routes in the event of simple network failures, for example. TE call admission would ultimately still rely on the former topology, however, and not the topology after any failure(s).

Overbooking in circuit systems is often enabled to provide statistical multiplexing gain. Hard TE limits are thus not useful and might be "softened" in some implementations. This is a result of the fact that real traffic often does not conform to the engineered profiles that TE systems rely on. In this scenario, TE degenerates to QoS differentiation in the datapaths, using such techniques as prioritization or Weighted Fair Queuing (WFQ).

Based on the premise that service revenues are not gained by rejecting communication sessions, it is generally desirable to maximize the number of sessions that communication system infrastructure can support at all times. Thus, there remains a need for improved communication session admission control techniques.

SUMMARY OF THE INVENTION

Some embodiments of the present invention relate to a non MPLS TE based approach to address the problem of how communication system gateways, such as media and mobile gateways, can implement call blocking to avoid congestion and reduce the impact on VoIP quality. This approach uses random discards with increasing probability depending on current voice network quality as determined from active measurements between gateways.

According to an aspect of the invention, there is provided a communication session admission control system. The system includes a state monitor adapted for monitoring a state of a communication system, and an admission control module operatively coupled to the state monitor and adapted for controlling admission of a communication session into the communication system based on a random admission control procedure and a current state of the communication system.

The communication system may include a plurality of gateways operatively coupled to each other and to respective communication stations between which communication sessions may be established through the gateways. The state monitor may then monitor a state of one or more of the plurality of gateways, a state of one or more connections between gateways of the plurality of gateways, or states of both one or more of the plurality of gateways and connections between the one or more of the plurality of gateways.

The admission control module may control admission of a communication session to be established between first and second gateways of the plurality of gateways based on the random admission control procedure and one or more of a state of the first gateway, a state of the second gateway, and a state of a connection between the first and second gateways.

In some embodiments, the admission control module controls admission of a communication session to be established between the first and second gateways further on the basis of a state of one or more other gateways of the plurality of gateways, a state of one or more connections between the first gateway and other gateways, a state of one or more connections between the second gateway and other gateways, and an overall state of the communication system.

The state monitor may monitor a state of the communication system by monitoring one or more of: a previously admitted communication session in progress in the communication system and a dedicated monitor communication session.

The system random admission control procedure may be a Random Early Detection (RED) type procedure or an Active Queue Management (AQM) type procedure, for example.

More generally, the random admission control procedure may involve determining a blocking probability for the communication session using a blocking probability function.

For a communication system that includes a plurality of gateways operatively coupled to each other and to respective communication stations between which communication sessions may be established through the gateways, the blocking probability function may be a gateway-specific blocking probability function associated with a gateway of the plurality of gateways through which the communication session is to be admitted into the communication system or a gateway pair-specific blocking probability function associated with a pair of gateways of the plurality of gateways through which the communication session is to be established.

The communication session admission control system could be implemented in such a communication system in one or more of the plurality of gateways, in one or more of the communication stations, or in communication session admission control equipment operatively coupled to one or more of the plurality of gateways, or be distributed between two or more of the plurality of gateways, two or more of the communication stations, one or more of the plurality of gateways and one or more of the communication stations, one or more of the plurality of gateways and the communication session admission control equipment, or one or more of the communication stations and the communication session admission control equipment.

The system may also include a memory, operatively coupled to the state monitor and to the admission control module, for storing information associated with a previous state of the communication system. The admission control module may then allow the random admission control procedure to be adjusted based on the previous state of the communication system and a current state of the communication system.

A method is also provided, and includes receiving a request to establish a communication session in a communication system, and determining whether to admit or block the communication session based on a random communication session admission control procedure and a current state of the communication system.

The communication system may include a plurality of gateways operatively coupled to each other and to respective communication stations between which communication sessions may be established through the gateways, in which case the method may also include monitoring a state of one or more of the plurality of gateways, a state of one or more connections between gateways of the plurality of gateways, or states of both one or more of the plurality of gateways and connections between the one or more of the plurality of gateways to determine the current state of the communication system. An operation of determining whether to admit or block the communication may then involve, for a communication session to be established between first and second gateways of the plurality of gateways, determining based on the random communication session admission control procedure and one or more of a state of the first gateway, a state of the second gateway, and a state of a connection between the first and second gateways.

In some embodiments, the method involves monitoring a previously established communication session to determine the current state of the communication system.

A dedicated monitor communication session may also or instead be established and monitored to determine the current state of the communication system.

The random communication session admission control procedure may involve determining a blocking probability for the communication session using a blocking probability function and comparing the determined blocking probability to a random number.

Some embodiments of the method also involve determining a previous state of the communication system, and adapting the random communication session admission procedure based on the previous state of the communication system and a current state of the communication system.

Another aspect of the invention provides a communication system gateway for controlling admission of communication sessions into a communication system. The gateway includes means for receiving a request to establish a communication session in the communication system, and means for determining whether to admit or block the communication session based on a random communication session admission control procedure and a current state of the communication system.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
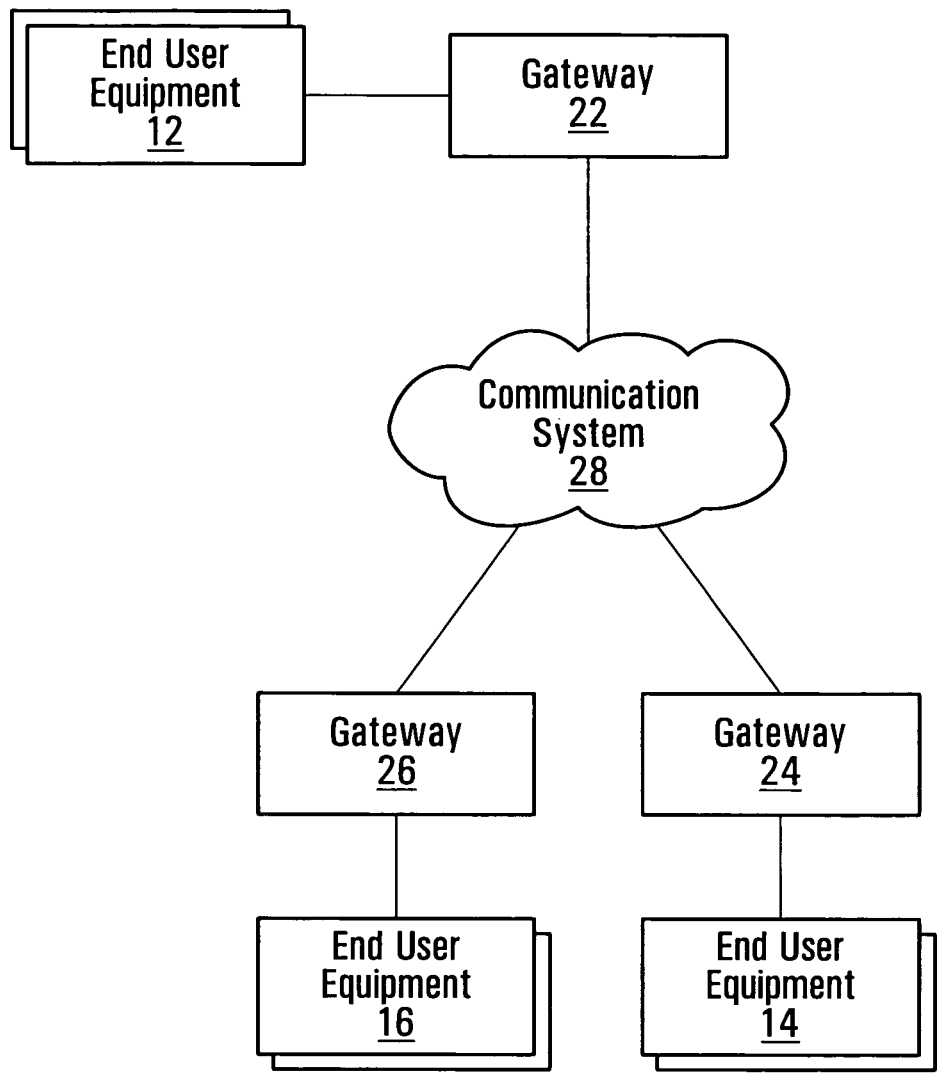
FIG. 1 is a block diagram of a communication system.

FIG. 1 is a block diagram of a communication system, and is illustrative of one possible implementation of an embodiment of the present invention. End user communication equipment 12, 14, 16, is connected to the communication system 28 through gateways 22, 24, 26. Although many installations of end user equipment 12, 14, 16 and gateways 22, 24, 26 may be connected to the communication system 28, only three examples of each of these components have been labelled in FIG. 1 to avoid excessive complication of the drawing. It should therefore be appreciated that the system of FIG. 1, as well as the contents of the other drawings, are intended solely for illustrative purposes, and that the present invention is in no way limited to the particular example embodiments explicitly shown in the drawings and described herein.

The end user equipment 12, 14, 16 represents communication equipment that is configured to generate and transmit and/or receive and terminate communication traffic. Although shown as being directly connected to the gateways 22, 24, 26, it will be apparent that the end user equipment 12, 14, 16 may communicate with the gateways 22, 24, 26 through other intermediate components (not shown).

Switches and routers are illustrative of the types of communication equipment represented by the gateways 22, 24, 26. The gateways 22, 24, 26 control access to the communication system 28 and thus have been shown separately in FIG. 1 for illustrative purposes.

The communication system 28, in addition to the gateways 22, 24, 26, may include core network elements and other equipment for routing communication traffic through the communication system 28. The communication system 28 may include any of various types of communication networks. However, it should be appreciated that embodiments of the invention may be applied to communication systems which include non-networked connections such as point-to-point interconnections between only some of the gateways 22, 24, 26.

Many different types of end user, intermediate, and network communication equipment, as well as the operation thereof, will be apparent to those skilled in the art. In general, communication traffic originating with the end user equipment 12, 14, 16, and possibly other sources of communication traffic, for transfer to a remote destination through the communication system 28 is received by a gateway 22, 24, 26, translated between different protocols or formats if necessary, and routed through the communication system 28. Embodiments of the invention are not limited to any particular types of communication equipment, transfer mechanisms, or protocols.

The bandwidth available in the communication system 28 at any time will be dependent upon the total bandwidth that can be supported by the gateways 22, 24, 26 and other components of the communication system 28, and the current actual bandwidth usage. As available bandwidth decreases, fewer additional communication sessions can be handled without degrading the quality of communications.

As noted above, gateways such as VoIP gateways need to know when new voice calls can be accepted or should instead be rejected in order to maintain a specified quality level for conversations. More generally, equipment through which communication sessions are admitted into a communication system should be able to determine whether a new communication session should be admitted into the system or blocked.

It may be desirable for a communication session admission control scheme to support a heterogeneous system. In such a solution, the gateways 22, 24, 26 interoperate amongst themselves, with no dependency on intermediate technology of the communication system 28. This also allows session admission control to be automated and managed according to configured policies, even under failure conditions during which system topology may change.

Admission decisions based on actual states or conditions in a communication system at the time of session establishment may also be advantageous. Active measurement of voice quality, for example, can increase the utilization of the communication system 28 without a priori knowledge of traffic profiles, codecs used, modem vs. fax vs. conversation, etc. This would avoid the problems associated with accurately predicting in a large scale system exactly how sessions such as voice calls will flow, the traffic profile they will follow, and the impact of failures on the particular paths used to route traffic for those communication sessions through the communication system 28.

In the event that communication quality degradation is experienced, the gateways 22, 24, 26 preferably react in a timely manner. One possible solution is to provide a predictive capability coupled with graceful degradation to avoid "all or nothing" session blocking, which can lead to a hysteresis effect as users retry blocked sessions, by redialling voice calls due to busy signals for instance.

Quality differentiation might also be provided by using configurable quality thresholds. Communication session admission control can be adapted to block new sessions to different degrees, depending upon current quality levels and configured thresholds. Varying levels of communications quality can thereby be maintained.

Random Early Detection (RED), which is used in some systems to determine whether packets are to be stored to queues or discarded, exhibits properties that can also be useful for communication session admission control, including graceful degradation when quality is being compromised. Blocking communication sessions according to a RED-type random call admission procedure can help avoid the effects of blocking all new sessions at once, which as noted above could result in mass voice call redialling for instance. A RED-type random call admission procedure could use a random decision process that is substantially similar to the process used in RED, although the application of that process is different in embodiments of the invention. Whereas a random process is used in RED to make packet discard decisions, embodiments of the invention instead apply a random process to communication session admission.

According to an aspect of the present invention, session admission control techniques combine monitoring of actual communication system state and a random admission control procedure.

Figure 2:
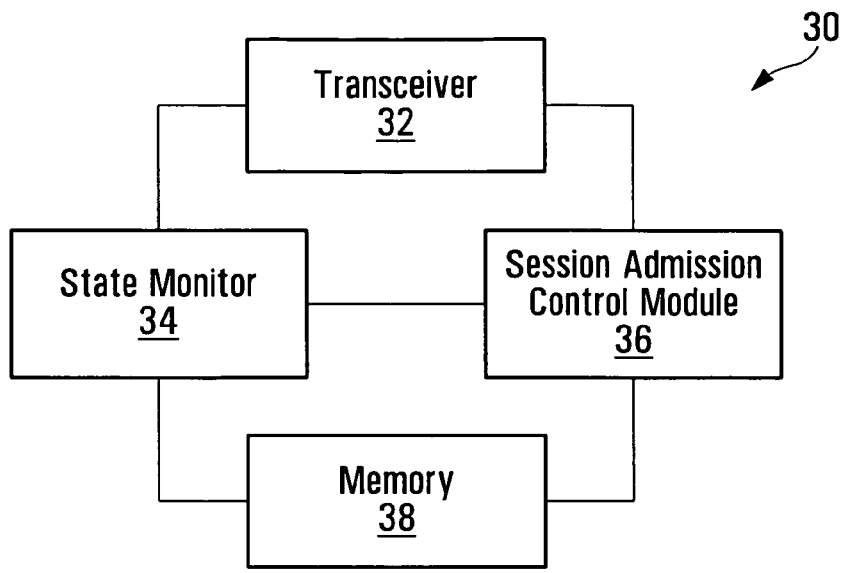
FIG. 2 is a block diagram of a communication session admission control system.

FIG. 2 is a block diagram of a communication session admission control system. The system 30 includes a transceiver 32, a state monitor 34 operatively coupled to the transceiver 32, a session admission control module 36 operatively coupled to the transceiver 32 and to the state monitor 34, and a memory 38 operatively coupled to the state monitor 34 and to the session admission control module 36.

Communication equipment incorporating the system 30 may include additional components that have not been shown in FIG. 2. It should also be appreciated that the specific division of functions represented by the functional components 32, 34, 36 is intended solely for the purposes of illustration and not to limit the scope of the invention. Other embodiments of the invention may include further, fewer, or additional components interconnected in a similar or different manner.

The components of the system 30 may be operatively coupled to each other through physical connections such as conductive traces on a substrate where the components are provided on an electronic circuit card for communication equipment and/or backplane conductors where the components are distributed between multiple cards in the same equipment. Logical interconnections are also contemplated, where any of the components of the system 30 are implemented using software for execution by one or more processing elements. In this case, components may access data stored in common storage locations in the memory 38, for example, and may thus be considered to be coupled to each other through a logical connection.

In some embodiments, the components of the system 30 are distributed between different devices, and accordingly the interconnections between components may be longer range connections, such as communication network connections. For example, a centralized state monitor 34 may be provided at a communication network server that is operatively coupled, through the network, to session admission control modules 36 in network gateways.

The transceiver 32 enables communications within a communication system for which communication session admission is controlled by the system 30. For example, the state monitor 34 may set up and/or monitor communication sessions through the transceiver 32, as described in further detail below. The transceiver 32 may also enable communication sessions to be established in the communication system by the session admission control module 36 or another component that actually establishes communication sessions that are not blocked by the session admission control module 36.

With reference to FIG. 1, where the system 30 is provided at a gateway 22, 24, 26, access links to the end user equipment 12, 14, 16 and communication links within the communication system 28 typically use different communication signal formats and protocols. Accordingly, the transceiver 32 may support multiple communication signal formats and/or protocols.

Various examples of such formats and protocols, as well as transceivers that support these formats and protocols, will be apparent to those skilled in the art. Embodiments of the invention are not restricted to any specific formats or protocols.

The state monitor 34 and the session admission control module 36, and to some extent the transceiver 32, may be implemented using hardware, software, firmware, or any combination thereof. Those skilled in the art will be familiar with many devices which may be used in implementing the system 30, such as microprocessors, microcontrollers, Application Specific Integrated Circuits (ASICs), Programmable Logic Devices (PLDs), and/or Field Programmable Gate Arrays (FPGAs), for example.

The memory 38, however, would generally be provided as a hardware component, and may include one or more memory devices. Solid state memory devices are common in communication equipment, although the memory 38 may also or instead include memory devices for use with movable or even removable storage media.

In view of the many possible implementations of the functional components shown in FIG. 2, these components are described herein primarily in terms of their operation. Based on the operational descriptions, a skilled person would be enabled to implement embodiments of the invention in any of various ways.

In operation, the state monitor 34 monitors a state of a communication system to which it is operatively coupled through the transceiver 32. This may involve, for example, communicating with gateways through which communication sessions are admitted to the communication system. With reference to FIG. 1, each of the gateways 22, 24, 26 may incorporate the system 30 and interact with each other through their respective transceivers 32 to allow each gateway to monitor the state of the communication system 28.

The gateway 22, for example, might periodically "probe" the other gateways 24, 26 so as to determine the status of the other gateways and/or the connections therebetween based on responses to probe messages. Loss, delay, or other characteristics may be monitored in this manner. The gateways 22, 24, 26 might also or instead establish closed loop "shadow" sessions for monitoring purposes.

Probe/response messages exchanges and shadow sessions represent examples of dedicated monitor sessions that may be established by the state monitor 34. Another possible approach is to monitor existing communication sessions to determine the state of a communication system. The latter approach may significantly reduce the resource consumption associated with state monitoring. The state monitor 34 may calculate signal quality characteristics such as delay and loss, for example, using active measurements from an existing voice call. In one embodiment, Real-time Transport Protocol (RTP) timestamp information is used to determine delay characteristics.

Other session monitoring techniques may also or instead be used in conjunction with existing communication sessions already in progress in a communication system, dedicated monitoring sessions such as probe/response message exchanges and closed loop shadow sessions, and/or further monitoring schemes. The present invention is in no way limited to any particular state monitoring technique.

It should be appreciated that states of a communication system, gateways, connections, or other components may, but need not necessarily, be states of physical components, but rather states which are determined through some form of interaction with those components. As noted above, the state monitor 34 may monitor communication signal quality in a communication system using actual communication sessions or dedicated monitoring sessions. Signal quality is thus one example of a system, gateway, or connection state. Some overall system state, such as a total number of sessions or any of various other measurements for instance, could also or instead be monitored. References herein to "states" should be interpreted accordingly.

The session admission control module 36 is operative to control admission of a communication session into a communication system based on a random admission procedure and a current state of the communication system. As described above, the state monitor 34 may monitor the states of communication equipment such as gateways, connections between communication equipment, or both. Any or all of these monitored states may be used by the session admission control module 36 in its session admission decision. Actual establishment of an admitted communication session may be handled by the session admission control module 36 or by another local or remote component controlled by the module 36.

Consider an illustrative example of a communication session to be established between communication stations such as the end user equipment 12, 16 (FIG. 1) through the gateways 22, 26. The session admission control module 36 of the gateway 22 might receive from the end user equipment 12 a call setup message or some other form of a request to establish a communication session, for instance. The session admission control module 36 may then make an admission decision as to whether the session should be blocked or admitted, using the random session admission procedure and any or all of the state of the gateway 22, the state of the gateway 26, and a state of a connection between the gateways 12, 16.

A session admission decision may thus be based on one or more than one monitored state. In the case of using multiple states, separately monitored states could be combined into a single state estimate for use in making session admission decisions. This combining of states may be handled by the state monitor 34, the session admission control module 36, or partially by both.

In the above example of a communication session between the end user equipment 12, 16, current states of the gateways 22, 26 and an interconnection through the communication system 28 may be combined and used in making the admission decision. This represents one example of a gateway pair-specific state. Another gateway pair-specific state could be determined for use in admission decisions at the gateway 22 for communication sessions between the gateways 22, 24. In a similar manner, pair-specific states could also be determined for use in admission decisions at the gateways 24, 26.

Maintenance of gateway pair-specific states may be a time- and resource-intensive task when a communication system includes a large number of gateways. Monitored states might be further combined or aggregated into an overall communication system-wide state to be used for all session admission decisions at a gateway, or possibly at all gateways, of a communication system. An aggregated state approach can reduce the number of states that are to be used by session admission control modules in a communication system.

The former approach uses gateway-specific states, and involves determining an overall state of the communication system from the perspective of each gateway. With reference again to FIG. 1, the state for the gateway 22 could combine the states of all monitored components associated with the gateway 22. If the gateways 24, 26 and connections between the gateway 22 and the other gateways are monitored, then all these states could be combined to determine the gateway-specific state for the gateway 22. All admission decisions for the gateway 22 then use the gateway-specific state regardless of the far-end gateway through which a communication session is to be established.

The communication system-wide status approach involves a still higher level of state combination, in that all monitored states are combined into a single state that is used for all admission decisions. In this case, the system-wide state could be a combination of all monitored gateways and interconnections, and all admission decisions for all gateways use the same state.

State information, which may include separate monitored states and/or combined states, may be stored in the memory 38 for access by the session admission control module 36.

Turning now to the random session admission procedure, state information is used by the session admission control module 36 in accordance with this procedure to determine whether sessions are to be admitted into the communication system or blocked. In some embodiments, a session blocking probability is assigned to a session based on current state information, such as communication signal quality measurement information. As quality degrades, the probability that a new session will be blocked increases.

All or nothing session blocking degenerates to a probability distribution of 0 or 1, which as noted above might be undesirable. According to embodiments of the invention, one or more blocking probability functions are used in a RED-type procedure or an Active Queue Management (AQM) type procedure so as to randomly admit/block new sessions under certain communication system states. In an implementation using a RED-type procedure, the session admission control module 36 may incorporate a random number generator for generating random numbers used in admission decisions.

Figure 3:
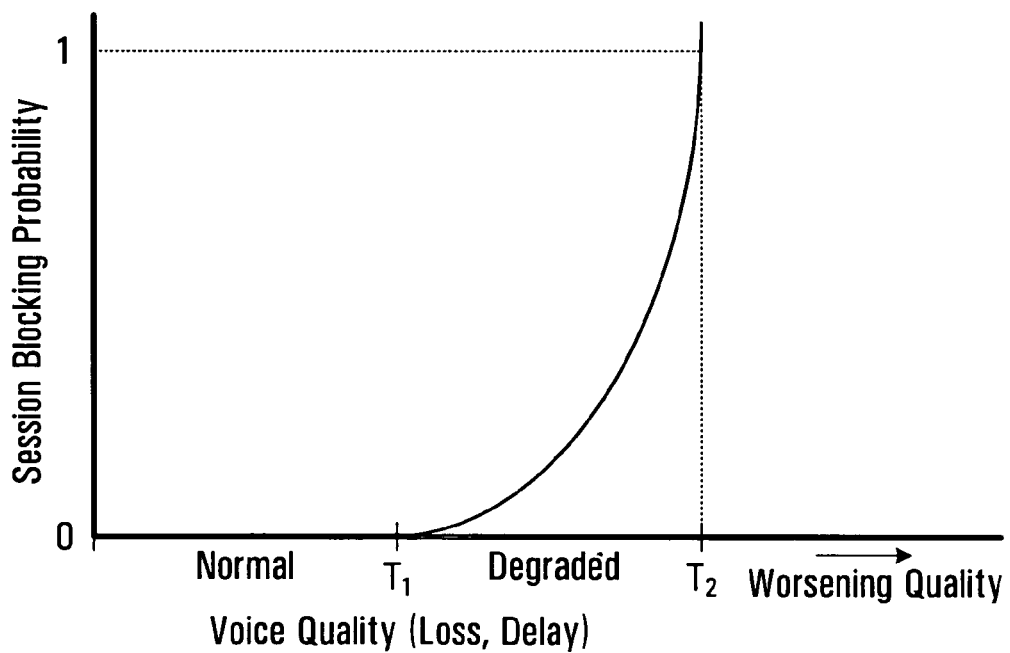
FIG. 3 is a plot of a communication session blocking probability function.

FIG. 3 is a plot of an example communication session blocking probability function, which maps states to session blocking probabilities. In FIG. 3, states are in the form of a combined state of voice call quality, which combines loss and delay state information. The two thresholds $T_1$ and $T_2$, which may be configurable, respectively establish a voice quality level at which new communication sessions begin to be blocked and a minimum acceptable voice quality. The threshold $T_2$ provides a measure of assurance that voice quality will be maintained at or above a minimum acceptable level. For worsening quality beyond T2, blocking probabilities may remain at 1, as shown.

The invention is not limited in any way to the specific session blocking probability function shown in FIG. 3. A session blocking probability function may be defined in terms of different state information, different shapes, different numbers of thresholds and/or different types of thresholds. For example, a session blocking probability function may be the inverse of an expected or measured session initiation pattern, since session admission may be intended to block new sessions when the communication system is busy. This pattern may vary between different systems and/or at different days/times for instance.

As will be apparent from FIG. 3, a session blocking probability can be assigned to a new communication session based on current voice quality. A probability table representing the blocking probability function could be stored in the memory 28 (FIG. 2), for example. According to a RED-type procedure, the blocking probability is then compared to a random number by the session admission control module 36, and if the blocking probability is higher than the random number, the session is blocked. Variations of this procedure and other possible random session admission procedures are also contemplated, and may be or become apparent to those skilled in the art.

Like the state information as described above, a blocking probability function used in session admission decisions for a particular gateway may be a communication system-wide function used for all admission decisions for all gateways, a gateway-specific function associated with the gateway, or a gateway pair-specific function associated with a pair of gateways through which a communication session is to be established.

It should also be appreciated that the admission procedure may be adapted or adjusted, such as by shifting a session blocking probability curve. Adjustments to the admission procedure might be made on the basis of historical state information stored in the memory 28, for example. In one embodiment, historical state information is used to select between different session blocking probability functions or to adjust thresholds and/or shapes of a session blocking probability function. With reference again to FIG. 3, the threshold $T_1$ could be adjusted downward at certain times of day during which historical state information indicates severe degradation of voice quality within a short period of time.

Historical information, including state information and/or possibly other information such as customer complaint information, might also or instead be used to determine when the admission procedure should be manually adjusted. Where customer complaints relating to voice quality increase dramatically under certain system usage conditions, state monitoring and session blocking probability function selection criteria might be adjusted so that more aggressive session blocking is used when system load approaches the historical complaint level.

Adjustment of thresholds and other configurable settings used by the system 30 may be provided through a local user interface, which may include such devices as a keyboard and a mouse. Remote configuration, from a Network Management System (NMS) through the transceiver 32 or a separate control transceiver or interface for instance, is also contemplated.

Regarding the actual deployment of the system 30 in a communication system, any of several implementations are possible. The system 30 could be incorporated into each gateway that is to control admission of communication sessions into the communication system, such as the gateways 22, 24, 26 (FIG. 1). It is also possible to deploy the system 30 in separate communication session admission control equipment, such as a server in the communication system 28. The server would be operatively coupled to any gateways for which it is to perform admission control functions. Another embodiment of the invention may involve providing the system 30 at one or more end communication stations such as the end user equipment 12, 14, 16.

Distributed deployments are also contemplated. For example, monitoring might be provided as a centralized function at a server in the communication system 28, with session admission control being supported at one or more of the gateways 22, 24, 26.

Figure 4:
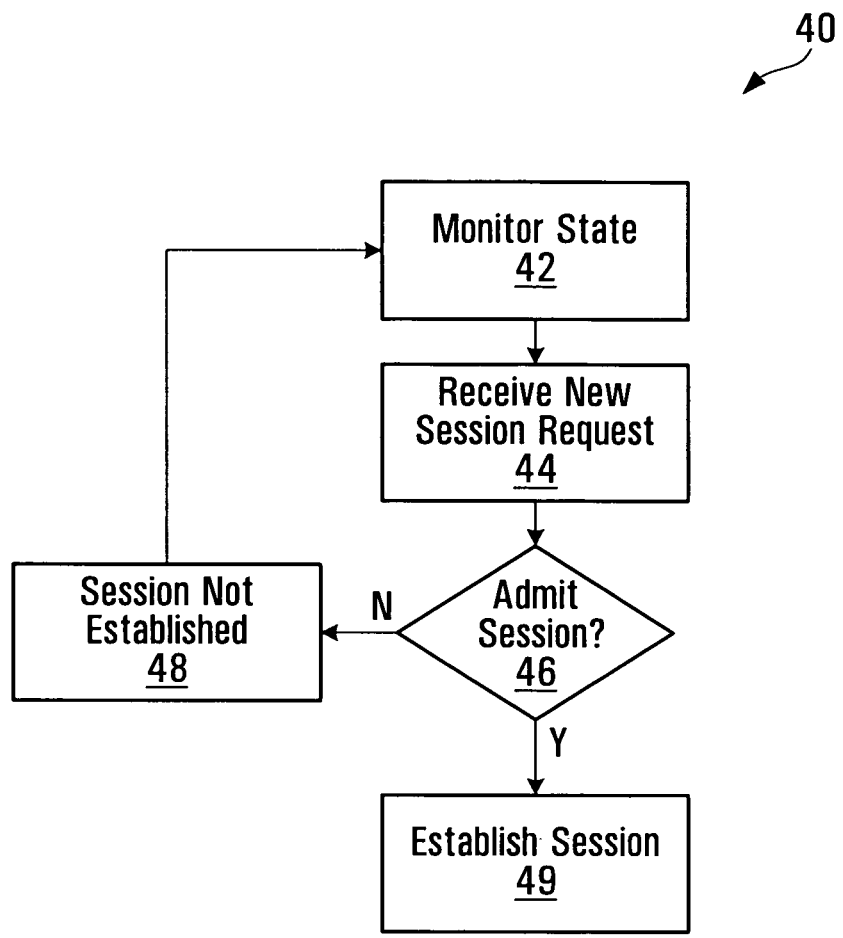
FIG. 4 is a flow diagram illustrating a communication session admission control method.

Although described above primarily in the context of a communication system and an admission control system, aspects of the invention may be implemented in other forms. FIG. 4 is a flow diagram illustrating a communication session admission control method, for example.

The method 40 involves monitoring a state of a communication system at 42. When a request to establish a new communication session in the communication system is received at 44, a session admission decision as to whether to admit or block the communication session is made at 46 based on a random communication session admission control procedure and a current state of the communication system. If blocked, the session will not be established, as indicated at 48. Otherwise, the session is established at 49. The manner in which the session is established is dependent upon the type of the communication system and the protocols used therein, for example. Whereas embodiments of the invention affect admission of communication sessions into a communication system, the operations involved in actually establishing admitted sessions at 49 may be substantially in accordance with conventional session establishment schemes.

Other embodiments of the invention may include fewer, further, or different operations performed in a similar or different order than explicitly shown in FIG. 4. For example, blocking of a voice call may cause a busy signal or other indication to be provided to an end user. Further variations, including different possible ways of performing the operations shown in FIG. 4, may be or become apparent to those skilled in the art. Some of these variations have been described above from a system perspective.

Embodiments of the invention may provide any or all of the advantageous features noted above. The disclosed techniques are applicable in a heterogeneous communication system and do not require participation by intermediate equipment between system gateways or other equipment that supports session admission control functions. Implementation can thus be relatively simple in comparison with other solutions. The quality of voice and other multimedia or QoS-sensitive services can be controlled without requiring network upgrades to MPLS-TE, ATM, etc., or high levels of interoperability between gateways and other communication equipment.

In addition, actual conditions rather than pre-computed values are used in session admission decisions, which can lead to a much greater optimization of system resources since only sessions that cannot physically be routed are blocked. State monitoring can also provide a continuous report on monitored states, such as measured voice quality, between admission control components in a communication system.

The use of priority of WFQ scheduling in conjunction with an admission control technique as described herein can provide QoS handling for admitted communication sessions. This may be important to maintain the quality of voice calls, which can be affected by other communication system traffic and its controls. In mobile communication networks, this tends to be mitigated by the fact that much of the traffic is voice and data traffic bandwidth is controlled. Gateways could also or instead use DiffServ, Label Switched Path (LSP) assignment with overbooking, or possibly other mechanisms to enable QoS differentiation in the datapath.

What has been described is merely illustrative of the application of principles of embodiments of the invention. Other arrangements and methods can be implemented by those skilled in the art without departing from the scope of the present invention.

For example, the invention is not restricted to any particular type of communication system. Embodiments of the invention may be applied in conjunction with any of various types of networks, such as existing mobile data networks, Ethernet networks, optical networks, ATM Unspecified Bit Rate (UBR) networks, MPLS networks, WiFi networks, WiMax networks, etc.

It should also be appreciated that implementation of session admission control in no way precludes other types of functions or features. For instance, a communication system that includes a gateway having session admission control according to an embodiment of the invention may include other gateways that provide conventional forms of admission control.

Furthermore, although described primarily in the context of methods and systems, other implementations of the invention are contemplated, as instructions stored on a machine-readable medium, for example.

We claim:

1. A communication session admission control system comprising:
   a state monitor adapted for monitoring voice communication signal quality in a communication system; and
   an admission control module operatively coupled to the state monitor and adapted for controlling admission of a communication session into the communication system based on a random admission control procedure and current voice communication signal quality in the communication system,
   wherein at least one of the state monitor and the admission control module is implemented using hardware,
   wherein the communication system comprises a plurality of gateways operatively coupled to each other and to respective communication stations between which communication sessions may be established through the gateways,
   wherein the state monitor is adapted for monitoring voice communication signal quality on one or more connections between gateways of the plurality of gateways,
   wherein the admission control module is adapted for controlling admission of a communication session to be established between first and second gateways of the plurality of gateways based on the random admission control procedure and current voice communication signal quality on a connection between the first and second gateways,
   wherein monitoring the voice communication signal quality comprises monitoring delay of a communication session.

2. The system of claim 1, wherein the admission control module is adapted for controlling admission of a communication session to be established between the first and second gateways further on the basis of current voice communication signal quality on one or more connections between the second gateway and other gateways and overall current voice communication signal quality in the communication system.

3. The system of claim 1, wherein the random admission control procedure comprises a Random Early Detection (RED) type procedure or an Active Queue Management (AQM) type procedure.

4. The system of claim 1, wherein the random admission control procedure comprises determining a blocking probability for the communication session using a blocking probability function.

5. The system of claim 1, further comprising:
a memory, operatively coupled to the state monitor and to the admission control module, for storing information associated with previous voice communication signal quality in the communication system.

6. A communication system comprising:
the communication session admission control system of claim 1, and
the plurality of gateways,
wherein the communication session admission control system is implemented in one or more of the plurality of gateways, in one or more of the communication stations, or in communication session admission control equipment operatively coupled to one or more of the plurality of gateways, or is distributed between two or more of the plurality of gateways, two or more of the communication stations, one or more of the plurality of gateways and one or more of the communication stations, one or more of the plurality of gateways and the communication session admission control equipment, or one or more of the communication stations and the communication session admission control equipment.

7. A communication session admission control system comprising:
a state monitor adapted for monitoring voice communication signal quality in a communication system; and
an admission control module operatively coupled to the state monitor and adapted for controlling admission of a communication session into the communication system based on a random admission control procedure and current voice communication signal quality in the communication system,
wherein at least one of the state monitor and the admission control module is implemented using hardware,
wherein the communication system comprises a plurality of gateways operatively coupled to each other and to respective communication stations between which communication sessions may be established through the gateways,
wherein the state monitor is adapted for monitoring voice communication signal quality on one or more connections between gateways of the plurality of gateways,
wherein the admission control module is adapted for controlling admission of a communication session to be established between first and second gateways of the plurality of gateways based on the random admission control procedure and current voice communication signal quality on a connection between the first and second gateways,
wherein the state monitor is adapted for monitoring voice communication signal quality in the communication system by monitoring a dedicated monitor communication session that is established to monitor voice communication signal quality.

8. A communication session admission control system comprising:
a state monitor adapted for monitoring voice communication signal quality in a communication system; and
an admission control module operatively coupled to the state monitor and adapted for controlling admission of a communication session into the communication system based on a random admission control procedure and current voice communication signal quality in the communication system,
wherein at least one of the state monitor and the admission control module is implemented using hardware,
wherein the random admission control procedure comprises determining a blocking probability for the communication session using a blocking probability function, wherein the communication system comprises a plurality of gateways operatively coupled to each other and to respective communication stations between which communication sessions may be established through the gateways, and
wherein the blocking probability function comprises a gateway-specific blocking probability function associated with a gateway of the plurality of gateways through which the communication session is to be admitted into the communication system or a gateway pair-specific blocking probability function associated with a pair of gateways of the plurality of gateways through which the communication session is to be established,
wherein monitoring the voice communication signal quality comprises monitoring delay of a communication session.

9. A communication session admission control system comprising:
a state monitor adapted for monitoring voice communication signal quality in a communication system;
an admission control module operatively coupled to the state monitor and adapted for controlling admission of a communication session into the communication system based on a random admission control procedure and current voice communication signal quality in the communication system; and
a memory, operatively coupled to the state monitor and to the admission control module, for storing information associated with previous voice communication signal quality in the communication system,
wherein the admission control module is further adapted for adjusting the random admission control procedure based on the previous voice communication signal quality in the communication system and the current voice communication signal quality in the communication system,
wherein monitoring the voice communication signal quality comprises monitoring delay of a communication session.

10. A method comprising:
monitoring by a state monitor voice communication signal quality in a communication system; and
controlling by an admission control module, operatively coupled to the state monitor, admission of a communication session into the communication system based on a random communication session admission control procedure and current voice communication signal quality in the communication system,
at least one of the state monitor and the admission control module being implemented using hardware,
wherein the communication system comprises a plurality of gateways operatively coupled to each other and to respective communication stations between which communication sessions may be established through the gateways,
wherein monitoring comprises monitoring voice communication signal quality on one or more connections between gateways of the plurality of gateways to determine the current voice communication signal quality in the communication system,
wherein controlling admission of the communication session comprises, for a communication session to be established between first and second gateways of the plurality of gateways, controlling admission based on the random communication session admission control procedure and current voice communication signal quality on a connection between the first and second gateways, wherein monitoring the voice communication signal quality comprises monitoring delay of a communication session.

11. The method of claim 10, wherein monitoring comprises:

monitoring quality of a previously established voice communication session to determine the current voice communication signal quality in the communication system.

12. The method of claim 10, wherein the random communication session admission control procedure comprises determining a blocking probability for the communication session using a blocking probability function and comparing the determined blocking probability to a random number.

13. A non-transitory machine-readable medium storing instructions which when executed perform the method of claim 10.

14. A method comprising:

monitoring by a state monitor voice communication signal quality in a communication system; and controlling by an admission control module, operatively coupled to the state monitor, admission of a communication session into the communication system based on a random communication session admission control procedure and current voice communication signal quality in the communication system, at least one of the state monitor and the admission control module being implemented using hardware, wherein the communication system comprises a plurality of gateways operatively coupled to each other and to respective communication stations between which communication sessions may be established through the gateways, wherein monitoring comprises monitoring voice communication signal quality on one or more connections between gateways of the plurality of gateways to determine the current voice communication signal quality in the communication system, wherein controlling admission of the communication session comprises, for a communication session to be established between first and second gateways of the plurality of gateways, controlling admission based on the random communication session admission control procedure and current voice communication signal quality on a connection between the first and second gateways, establishing a dedicated monitor communication session to monitor voice communication signal quality;

wherein monitoring comprises monitoring the dedicated monitor communication session to determine the current voice communication signal quality in the communication system.

15. A method comprising:

monitoring by a state monitor voice communication signal quality in a communication system; and controlling by an admission control module, operatively coupled to the state monitor, admission of a communication session into the communication system based on a random communication session admission control procedure and current voice communication signal quality in the communication system, at least one of the state monitor and the admission control module being implemented using hardware, the method further comprising:

determining previous voice communication signal quality in the communication system; and adapting the random communication session admission procedure based on the previous voice communication signal quality in the communication system and the current voice communication signal quality in the communication system, wherein monitoring the voice communication signal quality comprises monitoring delay of a communication session.

16. A communication session admission control system comprising:

a state monitor adapted for monitoring voice communication signal quality in a communication system; and an admission control module operatively coupled to the state monitor and adapted for controlling admission of a communication session into the communication system based on a random admission control procedure and current voice communication signal quality in the communication system, wherein at least one of the state monitor and the admission control module is implemented using hardware, wherein the random admission control procedure comprises determining a blocking probability for the communication session using a blocking probability function, wherein the blocking probability function is based on at least one threshold level of voice communication signal quality, wherein monitoring the voice communication signal quality comprises monitoring delay of a communication session.

17. A method comprising:

monitoring by a state monitor voice communication signal quality in a communication system; and controlling by an admission control module, operatively coupled to the state monitor, admission of a communication session into the communication system based on a random admission control procedure and current voice communication signal quality in the communication system, at least one of the state monitor and the admission control module being implemented using hardware, wherein the random admission control procedure comprises determining a blocking probability for the communication session using a blocking probability function, wherein the communication system comprises a plurality of gateways operatively coupled to each other and to respective communication stations between which communication sessions may be established through the gateways, and wherein the blocking probability function comprises a gateway-specific blocking probability function associated with a gateway of the plurality of gateways through which the communication session is to be admitted into the communication system or a gateway pair-specific blocking probability function associated with a pair of gateways of the plurality of gateways through which the communication session is to be established, wherein monitoring the voice communication signal quality comprises monitoring delay of a communication session.

18. A method comprising:

monitoring by a state monitor voice communication signal quality in a communication system; and controlling by an admission control module, operatively coupled to the state monitor, admission of a communication session into the communication system based on a random admission control procedure and current voice communication signal quality in the communication system, wherein at least one of the state monitor and the admission control module is implemented using hardware, wherein the random admission control procedure comprises determining a blocking probability for the communication session using a blocking probability function, wherein the blocking probability function is based on at least one threshold level of voice communication signal quality, wherein monitoring the voice communication signal quality comprises monitoring delay of a communication session.

* * * * *